Sept. 7, 1954 H. HUBBELL 2,688,735

MULTIPLE WIRE TERMINAL FOR MAIN AND BRANCHED CIRCUITS

Filed March 29, 1950

Inventor

By Harvey Hubbell

Wooster & Davis Attorneys.

Patented Sept. 7, 1954

2,688,735

UNITED STATES PATENT OFFICE 2,688,735

MULTIPLE WIRE TERMINAL FOR MAIN AND BRANCHED CIRCUITS

Harvey Hubbell, Long Hill, Conn.

Application March 29, 1950, Serial No. 152,538

5 Claims. (Cl. 339—61)

This invention relates to terminal clamps for connecting main and branch circuit leads together, such, for example, as may be employed in connecting to a main circuit, such as a house wiring system, branch circuit leads to a fixture, lamp, or other device. Heretofore, such connections have usually been made by soldering the branch circuit leads to the main circuit wires and taping the connections so made, a fussy and sometimes difficult operation, particularly when carried on in confined or cramped quarters. Other types of connections have employed binding posts and binding screws or the like for each wire, requiring considerable time to make each connection.

An object of this invention is to provide an improved terminal clamp constructed and arranged to permit connecting main and branch circuits, for example, without requiring any soldering or taping operations.

A further object is to provide a terminal clamp in which the branch circuit leads are connected to the main circiut without binding screws, thus simplifying the entire operation.

A further object is to provide a terminal clamp arranged to permit the branch circuit leads being connected to the main circuit merely by inserting the stripped ends of the branch leads into the clamp, after which they are secured against withdrawal by a single gang clamping operation.

A further object is to provide a terminal clamp of such character that any tension applied to the branch leads held by the clamp automatically increases the clamping grip on the leads and secures them against unintentional withdrawal.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figures 1, 2, 3, 4, 5, 6, 7, 8, 9, 10, 11, 12, 13, 14, 15, 16, 17:
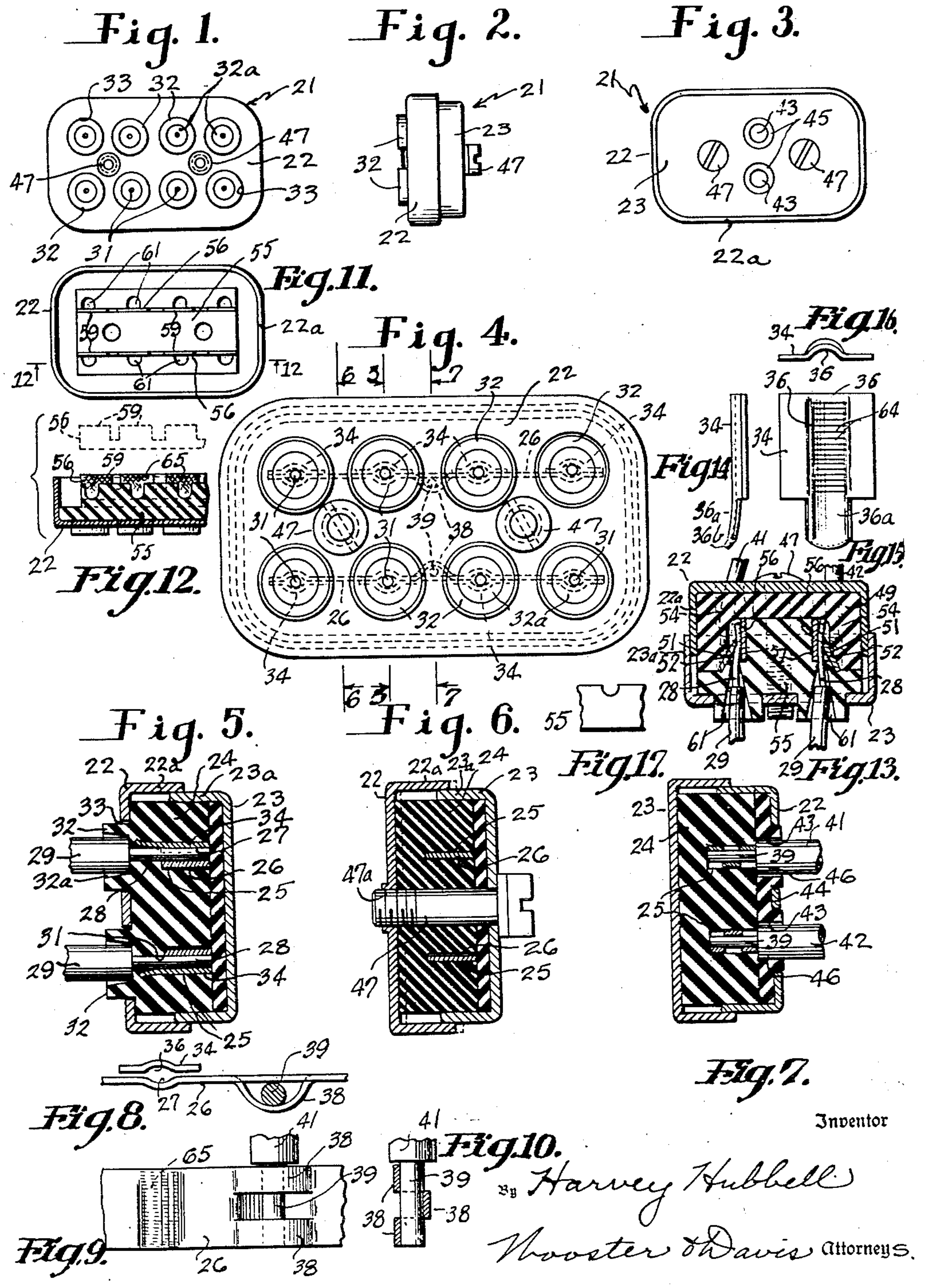
Figs. 1, 2 and 3 are front, side and back views, respectively, of a terminal clamp constructed in accordance with one embodiment of this invention.
Fig. 4 is a view similar to Fig. 1 on an enlarged scale.

Figs. 5, 6 and 7 are sections on the lines 5—5, 6—6 and 7—7 respectively, of Fig. 4;

Figs. 8, 9 and 10 are elevations, partly in section, of certain details forming part of the embodiment shown in Figs. 4 to 7;

Fig. 11 is an elevation of a portion of the interior of another embodiment;

Fig. 12 is a section on the line 12—12 of Fig. 11 and showing the clamping plate removed in dotted lines;

Fig. 13 is a cross section thereof when assembled;

Figs. 14, 15 and 16 are side, front and top views, respectively, of a detail, and Fig. 17 is a detail of a portion of a lead wire holding means.

The invention is shown as comprising an adjustable and contractable casing 21, so arranged as to be capable of applying an operating force to a wire clamping mechanism housed therein. As illustrated, the casing is formed by telescoping front and back cupped members 22 and 23, respectively, enclosing a block or body member 24 of yieldable, resilient insulating material such as a soft rubber or the like, either natural or synthetic. One member is smaller than the other so that their side walls 22*a* and 23*a* overlap for telescoping engagement with a good sliding fit. As shown in Figs. 4 to 7, the block or body member 24 is formed with a pair of longitudinal parallel slots 25 or channels opening through its back wall or surface in each of which is mounted a wire gripping current conducting contact plate or strip 26 of suitable material, such as bronze, copper or the like. At spaced intervals each contact plate or strip is bowed or offset laterally to provide a transverse groove 27 to accommodate the stripped ends 28 of branch circuit leads 29 which are inserted through openings 31 extending through the insulating block 24. The block has flanges 32 surrounding the openings 31 at the front, which extend through openings 33 in the front cover 22. The flanges surround and protect the ends of the insulating covers on the leads 29 and form sockets 32*a* to receive the ends of this insulation. A cooperating wire clamping member 34 is positioned in a groove or recess 25 formed in the block 24 opposite each plate groove 27. In Figs. 14, 15 and 16, each clamping member 34 is shown bowed or offset so as to be formed with a wire-receiving groove 36 which is positioned opposite and is curved in the opposite direction to the associated plate groove 27 to accommodate the lead 28. In effect, each plate 26 and clamping member 34 form wire gripping jaws. The bowed portions 27 and 36 being opposed to each other form a socket to receive the stripped end 28 of a conductor wire and clamp it between them. Each clamping member 34 has a guide tongue 36*a* which extends along the opening 31 toward the front cover 22 and forms a guide for the stripped end of a lead as it is inserted through the openings. The free end of this tongue 36a is curved outwardly as shown at 36b to guide the end of the wire into the socket between the two members.

As illustrated in Figs. 4, 7, 8 and 9, each contact plate 26 is lanced near its center and offset to provide wire gripping straps 38 by means of which the stripped ends 39 of the main circuit leads 41, 42, which may be, for example, a house wiring circuit, are connected, one to each contact plate 26. The main circuit leads are inserted into the straps 38 through openings 43 in an insulating cover or plate 44 on the back of the block 24 which closes the longitudinal slots 25 and is engaged by the back member 23 of the casing. The cover 44 has flanges 45 surrounding the openings 43 and extending through openings in the member 43 to receive and support the ends of the insulation 46 on the main circuit leads 41, 42.

A pair of clamping bolts or screws 47 extend through the back cover 23 and insulating block 24 and are threaded to the front cover at 47a for applying a clamping pressure to the resilient block 24. When such screws are tightened sufficiently, the resulting distortion or displacement of the material of the block presses the clamping members 34 and associated contact plates or strips 26 into gripping engagement with the stripped ends 28 of branch circuit leads 29.

In the embodiment illustrated in Figs. 11, 12 and 13, the back member 49 of the insulating body is provided with longitudinally extending, inwardly converging and inclined shoulders 51 on each side thereof. Contact plates 52, each connected to one of the main circuit leads 41, 42, in any desired manner but preferably as shown in Fig. 7, are supported on each shoulder 51 so that the inner edge of each plate 52 projects over the edge of the shoulder. As illustrated, the member 49 is formed of relatively rigid insulating material and has openings 54 through which the stripped ends 39 of the main circuit leads 41, 42 are inserted. In this embodiment, a block 55 of resilient insulating material, similar to that forming the block 24 is positioned between the contact plates 52 and has a wire gripping means, shown as a plate 56, corresponding to members 34 of the first form, secured in a slot 57 formed in the block 55 and located so that each gripping means is positioned adjacent the projecting edge of the associated contact plate 52. As shown in Figs. 11 and 12, each gripping plate 56 has a jaw 59 located adjacent an opening 61 in the block 55 whereby the stripped ends 28 of branch circuit leads 29 which are inserted through such openings will be positioned between the inner edge of one plate 52 and a clamping jaw 59. As illustrated in Fig. 13, the parts are enclosed in a casing comprising the cupped members 22 and 23 corresponding to members 22 and 23 of the first form and having telescoping side walls as shown.

In this embodiment, when clamping pressure is applied to the resilient block 55, the jaws 59 are pressed toward the edges of the contact plates 52 and the stripped ends 28 of branch circuit leads 29 are thereby electrically connected to the main circuit leads and are simultaneously gripped and held against withdrawal. Because of the converging arrangement of the contact plates, any tension applied to the branch leads when pressed against the plate edges will cause the plates 52 to cam against the leads and thus increase the gripping pressure.

When the main circuit leads have been connected to the contact plates in either embodiment, it is a simple and easy matter to connect one or more branch circuits merely by inserting the stripped ends 28 of the branch leads into the proper openings in the front cover 22 or 63, whereupon they are clamped in place merely by tightening the clamping bolt 47.

The invention can be adapted to connect any number of branch circuit leads. After the stripped ends of the leads are inserted as described, the single clamping operation is sufficient to secure all leads in place. The grip of the clamping members on the leads will be increased if the gripping surfaces of the grooves 27, members 34 and plates 52 and 56 are knurled, corrugated or otherwise roughened, as indicated at 64 and 65.

Although I have described only two specific embodiments of the invention, it will be apparent that it can be variously modified and adapted within the scope of the appended claims.

Having thus set forth the nature of my invention, I claim:

1. A terminal clamp for electric conductors to connect main and branch circuits comprising a pair of contact plates connected one to each of the main circuit leads, a clamping member associated with and located at one side of each of said contact plates, a resilient body member of insulating material enclosing the contact plates and clamping members having openings leading to the contact plates and clamping members through which branch circuit leads can be inserted to position said leads between an associated contact plate and clamping member to electrically connect respective branch circuit leads to said main circuit leads, a casing enclosing the resilient body member, contact strips and clamping members comprising telescoping cupped members each including an end wall and a peripheral side wall, the end walls being located on opposite sides of the resilient member and the side walls having telescoping sliding engagement, and means connecting the end walls for forcing said cupped members toward each other to compress said resilient material against opposite sides of the contact plates and clamping members whereby each branch lead is gripped between the associated contact plate and clamping member.

2. A terminal clamp for electric conductors to connect main and branch circuits comprising a contact plate connected to each of the main circuit leads, wire clamping means associated with each of said contact plates including a plurality of gripping jaws spaced along each contact plate at one side thereof, a resilient body member of insulating material enclosing the plates and jaws and having openings leading to said plates and jaws through which branch circuit leads can be inserted to position each lead between an associated contact plate and one of said jaws to electrically connect said branch lead to one of said main leads, a casing enclosing the resilient body member, contact plates and clamping means, comprising telescoping cupped members each including an end wall and a peripheral side wall, the end walls being located on opposite sides of the resilient member and the side walls having telescoping sliding engagement, and means connecting the end walls for connecting and forcing said telescoping casing members toward each other to compress said resilient material against opposite sides of the contact plates and said jaws whereby said branch lead is gripped between the associated contact plate and gripping jaw.

3. A terminal clamp for connecting a plurality of branch circuit leads to a main circuit, comprising a resilient body member of insulating material having spaced slots opening through one side and openings leading from the opposite side to said slots through which branch leads can be inserted, spaced conductor strips connected one to each of two main leads and positioned in separate slots in said member, a clamping member associated with each of said conductor strips and located at one side thereof, the openings in said resilient member providing guide means whereby branch leads can be inserted through said resilient member and positioned between said conductors and clamping members to electrically connect respective branch leads to said main leads, a cover plate of insulating material on the first mentioned side of the resilient member over the slots retaining the conductor strips and clamping members therein, a casing enclosing the resilient body member and the insulating cover plate comprising telescoping cupped members each including an end wall and a peripheral side wall, the end walls being located on opposite sides of the resilient member and the side walls having telescoping sliding engagement, and means connecting the end walls and for forcing said telescoping members toward each other to compress said resilient material against opposite sides of the conductor strips and clamping members, whereby the branch leads are clamped between the associated conductor strip and clamping members.

4. A terminal clamp for connecting a plurality of branch circuit leads to a main circuit, comprising a resilient body member of insulating material having spaced slots opening through one side and openings leading from the opposite side to the slots through which branch leads can be inserted, spaced conductor strips connected one to each of two main leads and positioned in spearate slots in said member, a clamping member associated with each of said conductor strips and located at one side thereof, the openings in said resilient member providing guide means leading to said slots and conductor strips whereby branch leads can be inserted through said resilient member and positioned between said conductor strips and the clamping members, a cover plate of insulating material on the first mentioned side of the resilient member over the slots retaining the conductor strips and clamping members therein, a casing enclosing the resilient body member and the insulating cover plate comprising telescoping cupped members each including an end wall and a peripheral side wall, the end walls being located on opposite sides of the resilient member and the side walls having telescoping sliding engagement, and means connecting the end walls for forcing said telescoping members toward each other to compress said resilient material against opposite sides of the conductor strips and clamping members whereby the branch leads are clamped between the associated conductor strip and clamping members.

5. A terminal clamp for connecting a plurality of branch circuit leads to a main circuit, comprising a resilient body member of insulating material having spaced slots opening through one side and openings leading from the opposite side to said slots through which branch leads can be inserted, spaced conductor strips connected one to each of two main leads and positioned in separate slots in said member, a clamping member associated with each of said conductor strips and located at one side thereof, the openings in said resilient member providing guide means whereby branch leads can be inserted through said resilient member and positioned between said conductors and clamping members to electrically connect respective branch leads to said main leads, a casing enclosing the resilient body member comprising telescoping cupped members each including an end wall and a peripheral side wall, the end walls being located at and covering the opposite sides of the resilient member and the side walls having telescoping sliding engagement, the end wall of the casing over the side of the resilient member having the openings therein being provided with larger openings in alignment with the openings in the resilient member, said member being provided with flanges surrounding and of larger diameter than the openings in this member located in the aligned openings in the casing end wall and forming sockets to enclose the adjacent end of the insulation on the stripped end of a lead wire connected to a conductor strip, and means connecting the end walls of the casing member for forcing said telescoping members toward each other to compress the resilient material against opposite sides of the conductor strips and clamping members whereby the leads are clamped between the associated conductor strip and clamping members.

References Cited in the file of this patent

UNITED STATES PATENTS

| Number | Name | Date |
|---|---|---|
| 1,615,168 | Doppke | Jan. 18, 1927 |
| 1,995,386 | Frank | Mar. 26, 1935 |
| 2,174,811 | White | Oct. 3, 1939 |
| 2,228,333 | Abbott | Jan. 14, 1941 |
| 2,228,334 | Abbott | Jan. 14, 1941 |
| 2,443,654 | Else et al. | June 22, 1948 |